United States Patent
Han et al.

(10) Patent No.: US 12,256,085 B2
(45) Date of Patent: Mar. 18, 2025

(54) WIRELESS PROJECTION METHOD AND APPARATUS

(71) Applicant: HUAWEI TECHNOLOGIES CO., LTD., Guangdong (CN)

(72) Inventors: Yunfeng Han, Suzhou (CN); Yanjie Gu, Shenzhen (CN); Zhan Guo, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 37 days.

(21) Appl. No.: 18/343,141

(22) Filed: Jun. 28, 2023

(65) Prior Publication Data

US 2023/0336742 A1    Oct. 19, 2023

Related U.S. Application Data

(63) Continuation of application No. PCT/CN2020/141022, filed on Dec. 29, 2020.

(51) Int. Cl.
| | |
|---|---|
| *H04N 19/164* | (2014.01) |
| *H04N 19/105* | (2014.01) |
| *H04N 19/172* | (2014.01) |
| *H04N 19/174* | (2014.01) |
| *H04N 19/187* | (2014.01) |
| *H04N 19/30* | (2014.01) |

(52) U.S. Cl.
CPC ......... *H04N 19/164* (2014.11); *H04N 19/105* (2014.11); *H04N 19/172* (2014.11); *H04N 19/174* (2014.11); *H04N 19/187* (2014.11); *H04N 19/30* (2014.11)

(58) Field of Classification Search
CPC .. H04N 19/164; H04N 19/187; H04N 19/105; H04N 21/43637; H04N 21/440027; H04N 21/4122
See application file for complete search history.

(56) References Cited

U.S. PATENT DOCUMENTS

| | | |
|---|---|---|
| 2010/0246390 A1 | 9/2010 | Wu et al. |
| 2012/0082076 A1 | 4/2012 | Kim et al. |
| 2015/0189298 A1* | 7/2015 | Ye ......................... H04N 19/513 375/240.16 |
| 2021/0120232 A1* | 4/2021 | Srikantam ............ H04N 19/159 |

* cited by examiner

*Primary Examiner* — Kathleen V Nguyen
(74) *Attorney, Agent, or Firm* — Rimon PC

(57) ABSTRACT

Embodiments of this application provide for a wireless projection method and apparatus. The embodiments relate to the communication field and reduce an occurrence of image tearing and freezing and image quality deterioration during wireless projection to improve a user's experience. The wireless projection method is applied to a Wi-Fi communication system. In the method, an electronic device transmits a scalable video coding slice of a first video frame to a display device in a first video transmission period. The method also includes obtaining channel state information that is fed back by the display device and that is used for transmitting the first video frame. The method also includes selectively enabling a retry mechanism based on the channel state information.

18 Claims, 6 Drawing Sheets

WIRELESS PROJECTION METHOD AND APPARATUS

CROSS-REFERENCE TO RELATED APPLICATIONS

This application is a continuation of International Application No. PCT/CN2020/141022, filed on Dec. 29, 2020, the disclosure of which is hereby incorporated by reference in its entirety.

TECHNICAL FIELD

This application generally relates to the communication field, and in particular, to a wireless projection method and apparatus.

BACKGROUND

Wireless projection is a technology in which screen information of a terminal, such as a mobile phone or a tablet, is coded and compressed, then wirelessly delivered to a screen device such as a television or a virtual reality (VR) device. The screen information may be wirelessly delivered by using a wireless networking technology such as Wi-Fi technology (a wireless local area network technology created by the Wi-Fi Alliance in the Institute of Electrical and Electronic Engineers (IEEE) 802.11 standard). The screen information may then be decoded, displayed, and output onto the screen device.

An existing wireless projection compression and transmission technology is mostly performed in video frames, which has disadvantages such as a high end-to-end delay and a weak anti-interference capability. These disadvantages greatly limit application of the wireless projection compression and transmission technology in scenarios such as being utilized in offices, for playing games, and for utilizing a VR device. A low-delay wireless projection solution that combines source coding and a wireless channel transmission technology can resolve the foregoing problems to some extent. In this solution, a terminal continuously divides each frame of video data into a plurality of data slices through source coding, and uses a scalable video coding technology on each slice to obtain a plurality of scalable bitstreams (e.g., layers, for example, one basic layer and a plurality of enhancement layers) with scaled-quality (or resolution). The terminal performs the Wi-Fi transmission on the scalable bitstream of the slice in a configured video transmission period (video service period (VSP)). In this case, the terminal needs to transmit one slice in a fixed time period in the VSP. If the transmission is not completed, the terminal needs to discard the slice, so that normal transmission of subsequent slices is not affected. Because scalable video coding is performed on each slice, for each slice, when Wi-Fi transmission of the basic layer succeeds but transmission of the enhancement layer fails, a bitstream having poor quality can still be decoded, to achieve capabilities of low-delay transmission and adapting to a wireless channel transmission fluctuation.

However, wireless channel interference usually occurs as burst interference. The foregoing solution results in a channel capacity fluctuation that is only through scalable coding, which results in a limited capability. When interference is strong in these Wi-Fi environments, the basic layer often fails to be correctly transmitted within a time period. In this case, image tearing and freezing and an image quality deterioration occur during the wireless projection. This affects the user's experience.

SUMMARY

Embodiments of this application provide for a wireless projection method and apparatus, to reduce image tearing and freezing and image quality deterioration that occur during wireless projection in order to improve user experience.

According to a first aspect, a wireless projection method is provided. The wireless projection method is applied to a wireless fidelity (Wi-Fi) communication system, and an electronic device that is connected to a display device through Wi-Fi. The wireless projection method includes that the electronic device transmits a scalable video coding slice of a first video frame to the display device in a first video transmission period. Also in the method, the electronic device obtains channel state information that is fed back by the display device and that is used for transmitting any scalable video coding slice of the first video frame. Also in the method, the electronic device selectively enables a retry mechanism based on the channel state information. When the retry mechanism is enabled, the electronic device transmits a first scalable video coding slice of a second video frame to the display device in a first time period in a second video transmission period, and transmits, to the display device in at least one other time period after the first time period, a portion that is of the first scalable video coding slice and that is discarded in the first time period. One other scalable video coding slice of the second video frame is transmitted in the at least one other time period. In this way, the electronic device can first transmit a scalable video coding slice of a video frame in a video transmission period. For example, the electronic device may transmit one scalable video coding slice in a time period in a video transmission period in an initial state. Certainly, if transmission of the scalable video coding slice is not completed in a corresponding time period, the scalable video coding slice is directly discarded. Then, the electronic device obtains the channel state information that is fed back by the display device and that is used for transmitting any scalable video coding slice of the first video frame. For example, after each time period, the channel state information for transmitting the scalable video coding slice in the time period may be obtained. It may be understood that the channel state information may reflect a portion of the scalable video coding slice and that is discarded in the corresponding time period. For example, a channel state may be a total quantity of data packets of the scalable video coding slice transmitted in one time period and a quantity of data packets that are successfully transmitted. In this way, the electronic device may selectively enable the retry mechanism based on the channel state information. For example, if the electronic device determines, based on the channel state information, that channel quality is poor, the electronic device enables the retry mechanism. When the channel quality is sufficient, the electronic device does not enable the retry mechanism. When the retry mechanism is already enabled, the electronic device disables the retry mechanism when the electronic device has determined that the channel quality is sufficient. When the retry mechanism is enabled, the electronic device transmits one scalable video coding slice in a plurality of time periods in a subsequent video transmission period. For example, the electronic device may transmit a first scalable video coding slice of another video frame to a display device in a first time period in a subsequent video transmission period, and transmits, to the display device in at least one other time period after the first time period, a portion of the first scalable video coding slice and that is discarded in the first time period. One other scalable video coding slice of the second video frame is transmitted in the at least one other time period. In this way, when one scalable video coding slice has a discarded portion in a corresponding time period, the discarded portion may be transmitted in another time period. For example, when transmission of one or more basic layers and at least one enhancement layer of a scalable video coding slice of a slice is not completed in a corresponding time period, the basic layer and the at least one enhancement layer have an opportunity of being transmitted in a next time period. In this way, the display device may perform decoding with reference to the first scalable video coding slices transmitted in the two time periods. In this way, it may be ensured that successful transmission of the scalable video coding slice, to the extent that is feasible based on the premise that a portion of a delay is sacrificed. This method also reduced image tearing and freezing and prevents image quality deterioration that conventionally may occur during wireless projection, and thereby improve user experience.

In a possible implementation, the scalable video coding slice includes one basic layer and at least one enhancement layer. That the electronic device transmits the first scalable coding slice of the second video frame in the first time period in the second video transmission period includes that the electronic device transmits a basic layer and at least one enhancement layer of the first scalable video coding slice of the second video frame to the display device in the first time period in the second video transmission period based on transmission priorities of the basic layer and the at least one enhancement layer of the first scalable video coding slice of the second video frame. Generally, scalable video coding is performed on each slice of the first video frame to obtain the scalable video coding slice. Therefore, for each scalable video coding slice, based on the transmission priorities, when the basic layer is successfully transmitted, but the enhancement layer fails to be transmitted, a bitstream having poor quality can still be decoded in order to achieve the capabilities of low-delay transmission and adapting to a wireless channel transmission fluctuation.

In a possible implementation, the scalable video coding slice includes the one basic layer and the at least one enhancement layer, the at least one other time period includes a second time period in the second video transmission period, and the other scalable video coding slice includes a second scalable video coding slice of the second video frame.

That the electronic device transmits, to the display device in at least one other time period after the first time period, the portion of the first scalable video coding slice and that is discarded in the first time period includes that the electronic device transmits, to the display device in the second time period based on the transmission priorities of the basic layer and the at least one enhancement layer of the first scalable video coding slice and transmission priorities of a basic layer and at least one enhancement layer of the second scalable video coding slice, the portion of the first scalable video coding slice and that is discarded and the second scalable video coding slice. The transmission priority of the basic layer of the first scalable video coding slice is higher than the transmission priority of the basic layer of the second scalable video coding slice, the transmission priority of the basic layer of the second scalable video coding slice is higher than the transmission priority of the enhancement layer of the first scalable video coding slice, and the transmission priority of the enhancement layer of the first scalable video coding slice is higher than the transmission priority of the enhancement layer of the second scalable video coding slice. In this way, data transmitted in the second time period may be transmitted in a manner of preferentially transmitting the basic layer of the first scalable video coding slice, then transmitting the basic layer of the second scalable coding slice, then transmitting the enhancement layer of the first scalable coding slice, and finally transmitting the enhancement layer of the second scalable coding slice. This preferentially-based sequence ensures that the basic layer of each scalable video coding slice is transmitted successfully in sequence in the corresponding time period, and then ensures that the enhancement layer of each scalable video coding slice is sequentially transmitted successfully in the time period.

In a possible implementation, the discarded portion of the first scalable video coding slice includes the basic layer and the at least one enhancement layer of the first scalable video coding slice. That the electronic device transmits, to the display device in the at least one other time period after the first time period, the portion of the first scalable video coding slice and that is discarded in the first time period includes that the electronic device transmits the basic layer and the at least one enhancement layer of the first scalable video coding slice to the display device in the at least one other time period after the first time period. In this solution, if both the basic layer and the at least one enhancement layer of the first scalable video coding slice are discarded in the second video transmission period (that is (transmission is not completed), the basic layer and the at least one enhancement layer of the first scalable video coding slice may be retransmitted in the at least one other time period after the first time period.

In a possible implementation, a discarded portion of the first scalable video coding slice includes the at least one enhancement layer of the first scalable video coding slice. That the electronic device transmits, to the display device in at least one other time period after the first time period, the portion of the first scalable video coding slice and that is discarded in the first time period includes that the electronic device transmits the at least one enhancement layer of the first scalable video coding slice to the display device in the at least one other time period after the first time period. In this solution, if only the at least one enhancement layer of the first scalable video coding slice is discarded (that is transmission is not completed) in the first time period, only the at least one enhancement layer of the first scalable video coding slice may be retransmitted in the at least one other time period after the first time period.

In a possible implementation, the method further includes: after the at least one other time period, reconstructing a reference frame based on the successfully transmitted portion of the first scalable video coding slice. The method further includes generating first scalable video coding of a third video frame based on the reference frame. In this way, when the electronic device transmits the third video frame, for the first scalable video coding slice of the second video frame, reference may be made to portions that are successfully transmitted in the first time period and the at least one other time period after the first time period. In this way, formed inter-predictive frame (e.g., predictive frame, P frame for short) coding can reduce an amount of data to be coded, and help ensure that the third video frame of the electronic device can be decoded based on an actually successfully-transmitted portion after being transmitted to the display device.

According to a second aspect, a wireless projection method is provided. The wireless projection applied to a Wi-Fi communication system, and an electronic device that is connected to a display device through Wi-Fi. The wireless projection method includes that the display device receives a scalable video coding slice of a first video frame that is transmitted by the electronic device to the display device in a first video transmission period. The method further includes that the display device feeds back, to the electronic device, channel state information for transmitting the first video frame. The electronic device selectively enables a retry mechanism based on the channel state information. The display device decodes the scalable video coding slice transmitted by the electronic device in the first video transmission period. The display device receives a first scalable video coding slice of a second video frame transmitted by the electronic device in a first time period in a second video transmission period from the retry mechanism. The display device receives a portion of the first scalable video coding slice and that is discarded in the first time period and that is transmitted by the electronic device in at least one other time period after the first time period. One other scalable video coding slice of the second video frame is transmitted in the at least one other time period. The display device decodes the first scalable video coding slice of the second video frame transmitted by the electronic device in the first time period and a portion of the first scalable video coding slice and that is discarded in the first time period and that is transmitted in the at least one other time period after the first time period.

In a possible implementation, the scalable video coding slice includes one basic layer and at least one enhancement layer. That the display device receives the first scalable video coding slice of the second video frame transmitted by the electronic device in the first time period in the second video transmission period includes that the display device receives the basic layer and the at least one enhancement layer of the first scalable video coding slice of the second video frame that are transmitted by the electronic device in the first time period in the second video transmission period based on transmission priorities of the basic layer and the at least one enhancement layer of the first scalable video coding slice.

In a possible implementation, the scalable video coding slice includes the one basic layer and the at least one enhancement layer. That the display device receives the portion of the first scalable video coding slice and that is discarded in the first time period and that is transmitted by the electronic device in at least one other time period after the first time period includes that the display device receives the basic layer and the at least one enhancement layer that are of the first scalable video coding slice and that are transmitted by the electronic device in the at least one other time period after the first time period.

In a possible implementation, the scalable video coding slice includes the one basic layer and the at least one enhancement layer. That the display device receives the portion of the first scalable video coding slice and that is discarded in the first time period and that is transmitted by the electronic device in at least one other time period after the first time period includes that the display device receives the at least one enhancement layer of the first scalable video coding slice transmitted by the electronic device in the at least one other time period after the first time period.

According to a third aspect, a wireless projection apparatus is provided, used in a Wi-Fi communication system. The wireless projection apparatus may be an electronic device, the wireless projection apparatus may be a module or a chip in the electronic device, or the electronic device may be a chip or a system on chip. The wireless projection apparatus includes a transmitter that is configured to transmit a scalable video coding slice of a first video frame to a display device in a first video transmission period. The wireless projection apparatus further includes a receiver that is configured to obtain channel state information that is fed back by the display device and that is for transmitting the first video frame. The wireless projection apparatus further includes a processor that is configured to selectively enable a retry mechanism based on the channel state information obtained by the receiver. During the retry mechanism, the transmitter is further configured to transmit a first scalable video coding slice of a second video frame to the display device in a first time period in a second video transmission period, and transmit, to the display device in at least one other time period after the first time period, a portion of the first scalable video coding slice and that is discarded in the first time period. One other scalable video coding slice of the second video frame is transmitted in the at least one other time period.

In a possible implementation, the scalable video coding slice includes one basic layer and at least one enhancement layer. The transmitter is configured to transmit the basic layer and the at least one enhancement layer of the first scalable video coding slice of the second video frame to the display device in the first time period in the second video transmission period based on transmission priorities of the basic layer and the at least one enhancement layer of the first scalable video coding slice of the second video frame.

In a possible implementation, the scalable video coding slice includes the one basic layer and the at least one enhancement layer, the at least one other time period includes a second time period in the second video transmission period, and the other scalable video coding slice includes a second scalable video coding slice of the second video frame. The transmitter is configured to transmit, to the display device in the second time period based on the transmission priorities of the basic layer and the at least one enhancement layer of the first scalable video coding slice and transmission priorities of a basic layer and at least one enhancement layer of the second scalable video coding slice, the portion of the first scalable video coding slice and that is discarded and the second scalable video coding slice. The transmission priority of the basic layer of the first scalable video coding slice is higher than the transmission priority of the basic layer of the second scalable video coding slice, the transmission priority of the basic layer of the second scalable video coding slice is higher than the transmission priority of the enhancement layer of the first scalable video coding slice, and the transmission priority of the enhancement layer of the first scalable video coding slice is higher than the transmission priority of the enhancement layer of the second scalable video coding slice.

In a possible implementation, the discarded portion of the first scalable video coding slice includes the basic layer and the at least one enhancement layer of the first scalable video coding slice. The transmitter is configured to transmit the basic layer and the at least one enhancement layer of the first scalable video coding slice to the display device in the at least one other time period after the first time period.

In a possible implementation, the discarded portion of the first scalable video coding slice includes the at least one enhancement layer of the first scalable video coding slice. The transmitter is configured to transmit the at least one enhancement layer of the first scalable video coding slice to the display device in the at least one other time period after the first time period.

In a possible implementation, the processor is further configured to, after the at least one other time period, reconstruct a reference frame based on a successfully transmitted portion of the first scalable video coding slice. The processor is further configured to generate first scalable video coding of a third video frame based on the reference frame.

According to a fourth aspect, a wireless projection apparatus is provided, used in a Wi-Fi communication system. The wireless projection apparatus may be a display device, the wireless projection apparatus may be a module or a chip in the display device, and the display device may be a chip or a system on chip. The wireless projection apparatus includes a receiver that is configured to receive a scalable video coding slice of a first video frame that is transmitted by an electronic device to the display device in a first video transmission period. The wireless projection apparatus further includes a transmitter that is configured to feed back, to the electronic device, channel state information for transmitting the first video frame. The electronic device selectively enables a retry mechanism based on the channel state information. A processor is configured to decode the scalable video coding slice transmitted by the electronic device in the first video transmission period. The receiver is further configured to receive a first scalable video coding slice of a second video frame transmitted by the electronic device in a first time period in a second video transmission period in the retry mechanism. The receiver is further configured to receive a portion of the first scalable video coding slice and that is discarded in the first time period and that is transmitted by the electronic device in at least one other time period after the first time period. One other scalable video coding slice of the second video frame is transmitted in the at least one other time period. The processor is further configured to decode the first scalable video coding slice of the second video frame transmitted by the electronic device in the first time period and the portion that is of the first scalable video coding slice and that is discarded in the first time period and that is transmitted in the at least one other time period after the first time period.

In a possible implementation, the scalable video coding slice includes one basic layer and at least one enhancement layer. The receiver is configured to receive the basic layer and the at least one enhancement layer of the first scalable video coding slice of the second video frame that are transmitted by the electronic device in the first time period in the second video transmission period based on transmission priorities of the basic layer and the at least one enhancement layer of the first scalable video coding slice.

In a possible implementation, the scalable video coding slice includes the one basic layer and the at least one enhancement layer. The receiver is configured to receive the basic layer and the at least one enhancement layer of the first scalable video coding slice that are transmitted by the electronic device in the at least one other time period after the first time period.

In a possible implementation, the scalable video coding slice includes the one basic layer and the at least one enhancement layer. The receiver is configured to receive the at least one enhancement layer of the first scalable video coding slice transmitted by the electronic device in the at least one other time period after the first time period.

According to a fifth aspect, a computer-readable storage medium is provided. The computer-readable storage medium stores a computer program. When the computer program is run on a computer, the computer is enabled to perform the method according to any one of the foregoing aspects.

According to a sixth aspect, a computer program product including instructions is provided. The computer program product includes computer program code. When the computer program code is run on a computer, the computer is enabled to perform the method according to any one of the foregoing aspects.

According to a seventh aspect, a communication system is provided. The communication system includes the wireless projection apparatus in the third aspect and the wireless projection apparatus in the fourth aspect. In an example, the wireless projection apparatus according to the third aspect may be an electronic device, for example, a mobile phone. The wireless projection apparatus according to the fourth aspect may be a display device, for example, a radio television set.

For technical effects brought by any design manner of the second to the seventh aspects, refer to the technical effects brought by different design manners of the first aspect. Details are not described herein again.

DESCRIPTION OF EMBODIMENTS

Figure 1:
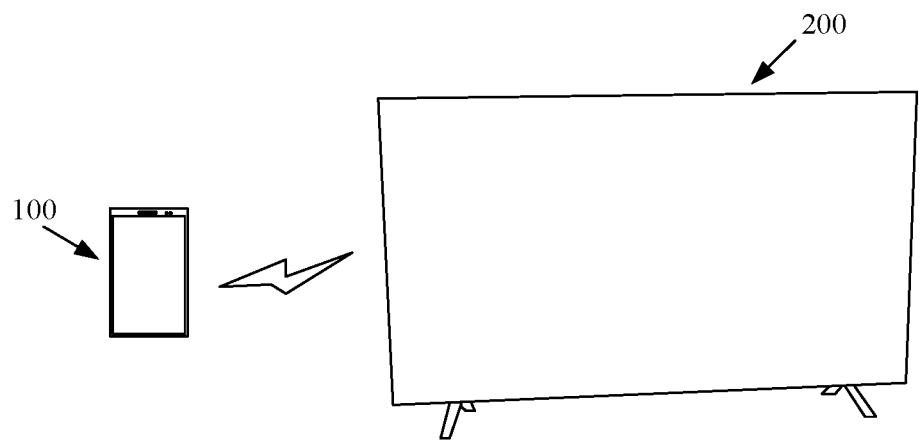
FIG. 1 is a schematic diagram of an architecture of a communication system according to an embodiment of this application.

The terms "first" and "second" mentioned below are merely intended for a purpose of description, and should not be understood as an indication or implication of relative importance or implicit indication of the number of indicated technical features. Therefore, a feature limited by "first" or "second" may explicitly or implicitly include one or more features. In the description of embodiments of this application, unless otherwise specified, "a plurality of" means two or more than two.

In conventional technologies, a terminal can perform coding and compression on screen information of the terminal by using a wireless projection technology, then wirelessly deliver the screen information to a screen device such as a television or a virtual reality (VR) device by using a wireless fidelity (Wi-Fi) technology, and then decode, display, and output the screen information. A low-delay wireless projection solution that combines source coding and a wireless channel transmission technology can reduce disadvantages such as a high end-to-end delay and a weak anti-interference capability to some extent. A main principle of the low-delay wireless projection solution to combine the source coding and the wireless channel transmission technology is as follows: the terminal continuously divides each frame of video data into a plurality of slices based on the source coding, and uses a scalable video coding technology on each slice to obtain a plurality of layers with the quality (or resolution) of each slice to be scaled. The terminal performs Wi-Fi transmission on a scalable bitstream of the slice in a configured video transmission period (video service period (VSP)). In this case, the terminal needs to transmit one slice in a time period in the VSP. If the transmission is not completed, the terminal needs to discard the slice, so that normal transmission of subsequent slices is not affected. Because scalable video coding is performed on each slice, for each slice, when Wi-Fi transmission of a basic layer succeeds but transmission of an enhancement layer fails, a bitstream having poor quality can still be decoded. This method achieves the capabilities of low-delay transmission and adapting to wireless channel transmission fluctuation. However, wireless channel interference usually occurs in burst interference. The foregoing solution reduces a channel capacity fluctuation only by using scalable coding, which results in a limited capability. When interference is strong in the Wi-Fi environments, the basic layer often fails to be correctly transmitted within a time period. In this case, image tearing and freezing and image quality deterioration occurs during wireless projection. This affects the user's experience.

Embodiments of this application provide for a wireless projection method. The wireless projection method may be applied to a Wi-Fi communication system. In the Wi-Fi communication system, an electronic device is connected to a display device through Wi-Fi. The electronic device wirelessly delivers screen information of the electronic device to the display device, and then decodes, displays, and outputs the screen information. By using the wireless projection method provided in the embodiments of this disclosure, the electronic device transmits a scalable video coding slice of a first video frame to the display device in a first video transmission period. One scalable video coding slice of the first video frame is correspondingly transmitted in one time period in the first video transmission period. For example, the electronic device performs scalable video coding on a plurality of data slices of the first video frame in sequence to generate a plurality of scalable video coding slices. For example, the electronic device codes a plurality of data slices of the first video frame into a plurality of the scalable video coding slices. The one scalable video coding slice may include a basic layer and at least one enhancement layer. Then the electronic device transmits the scalable video coding slice of the video frame in each time period in the video transmission period. The electronic device transmits one scalable video coding slice in a time period in a video transmission period in an initial state. Certainly, if transmission of the scalable video coding slice is not completed in a corresponding time period, the scalable video coding slice is directly discarded. Then, the electronic device obtains channel state information that is fed back by the display device and that is for transmitting any scalable video coding slice of the first video frame. For example, after each time period, the channel state information for transmitting the scalable video coding slice in the time period may be obtained. It may be understood that the channel state information may reflect a portion that is of the scalable video coding slice and that is discarded in the corresponding time period. For example, the channel state information may be a total quantity of data packets of the scalable video coding slice transmitted in one time period and a quantity of data packets that are successfully transmitted. In this way, the electronic device may selectively enable a retry mechanism based on the channel state information. For example, if the electronic device determines, based on the channel state information, that channel quality is poor, the electronic device enables the retry mechanism. When the channel quality is sufficient, the electronic device does not enable the retry mechanism. When the retry mechanism is already enabled, the electronic device disables the retry mechanism when the electronic device determines that the channel quality is sufficient. During the retry mechanism, the electronic device transmits one scalable video coding slice in a plurality of time periods in a subsequent video transmission period. For example, the electronic device transmits a first scalable video coding slice of another video frame to a display device in a first time period in a subsequent video transmission period, and transmits, to the display device in the at least one other time period after the first time period, a portion of the first scalable video coding slice and that is discarded in the first time period. One other scalable video coding slice of a second video frame is transmitted in the at least one other time period. In this way, when one scalable video coding slice has a discarded portion in a corresponding time period, the discarded portion may be transmitted in another time period. For example, when one or more of a basic layer and at least one enhancement layer of the scalable video coding slice of a slice is discarded (i.e., transmission is not completed) in a corresponding time period, the basic layer and the at least one enhancement layer have an opportunity of being transmitted in a next time period. In this way, the display device may perform decoding with reference to the first scalable video coding slices transmitted in the two time periods, to ensure successful transmission of the scalable video coding slice, to the extent that is feasible based on the premise that a portion of a delay is sacrificed. This arrangement facilitates for reduced image tearing and freezing and prevents image quality deterioration to occur during wireless projection, thereby improving user experience. In addition, after the at least one other time period, a reference frame is reconstructed based on the successfully transmitted portion of the first scalable video coding slice, and the first scalable video coding of a third video frame is generated based on the reference frame. In this way, when the electronic device transmits the third video frame, for the first scalable video coding slice of the second video frame, reference may be made to portions that are successfully transmitted in the first time period and the at least one other time period after the first time period. In this way, formed inter-predictive frame (e.g., predictive frame, P frame for short) coding can reduce an amount of data to be coded, and help ensure that the third video frame of the electronic device can be decoded based on an actually successfully transmitted portion after being transmitted to the display device.

The following describes in detail a wireless projection method and an apparatus provided in embodiments of this application with reference to the accompanying drawings.

FIG. 1 is a schematic diagram of a communication system to which a wireless projection method is applied according to an embodiment of this application. As shown in FIG. 1, the communication system includes an electronic device 100 and a display device 200. The electronic device 100 may be connected to the display device 200 through a wireless network, for example, through a Wi-Fi network.

Figure 2:
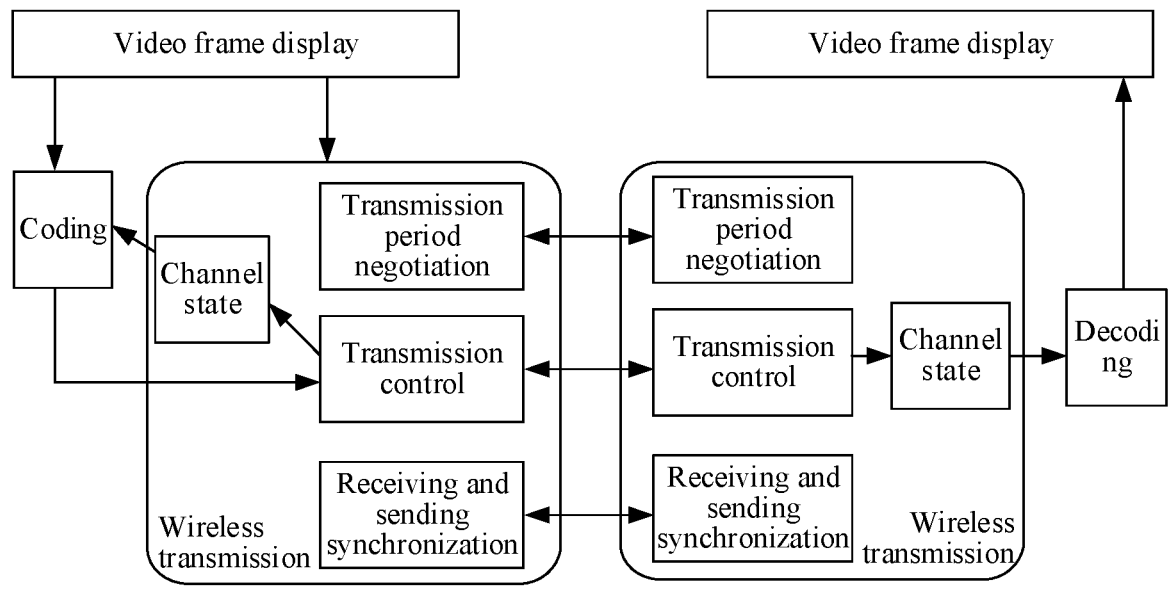
FIG. 2 is a schematic diagram of a functional architecture of an electronic device according to an embodiment of this application.
Figure 3:
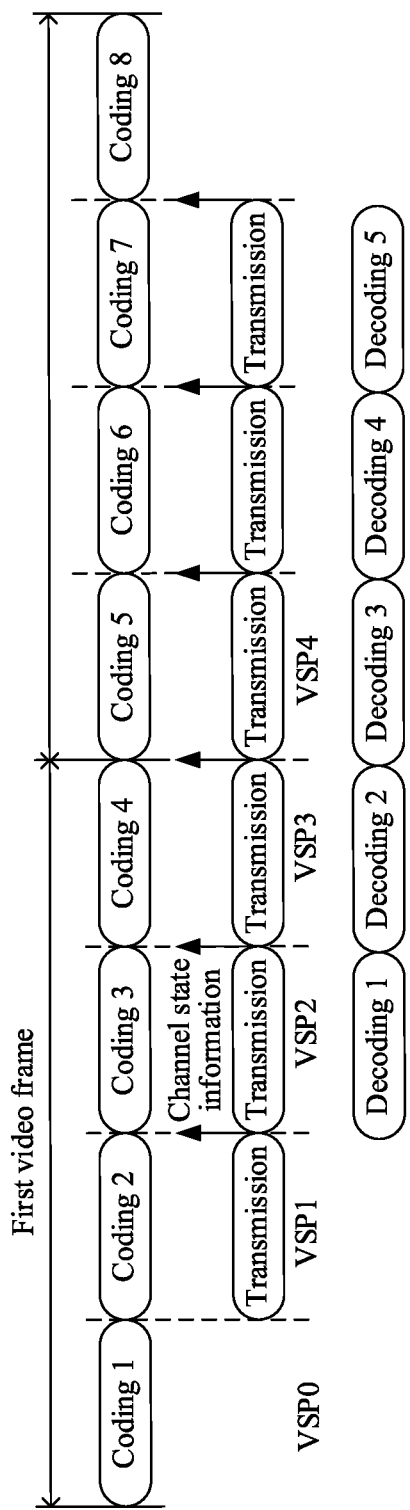
FIG. 3 is a schematic diagram of a pipeline structure of a wireless projection method according to an embodiment of this application.

In some embodiments, the electronic device 100 sends content displayed on a screen to the display device 200 through the Wi-Fi network, and the display device 200 displays the content. In other words, in a wireless projection process, displayed content of the electronic device 100 is the same as that that is displayed the display device 200. For details, refer to a schematic diagram of a principle of wireless projection in FIG. 2. The electronic device 100 may have the following functions. First, the electronic device 100 can display a video frame as a screen image, and can capture the displayed screen image as a video frame for frame buffering. In addition, the electronic device 100 can provide frame-level timing, to be specific, the electronic device 100 may divide a video frame into a plurality of slices in sequence based on a VSP, where each time period in the VSP corresponds to one slice. The electronic device 100 can perform scalable video coding (SVC) (coding 1 to coding 8 as shown in FIG. 3) on a slice. For example, the electronic device 100 may split a slice into a plurality of resolutions, qualities, and frame rate layers. The electronic device 100 may adjust a coding bit rate of a slice based on a channel state. In other words, the slice is divided in terms of time, space, and quality, and multi-layer bitstreams (including a basic layer and an enhancement layer) are output. Data of the basic layer may enable the display device 200 to decode basic video content completely and normally, but a video image obtained by using the data of the basic layer may have a low frame rate, low resolution, or low quality. When a channel is limited or a channel environment is complex, a decoder may not receive a smooth video image that can be watched. When the channel environment is sufficient or there are abundant channel resources, data of the enhancement layer may be transmitted to improve a frame rate, resolution, or video quality. The enhancement layer may be multi-layer coded, which means that in a range of a total bit rate of a video bitstream, a higher received bit rate indicates better video quality. The electronic device 100 may further negotiate a transmission period with the display device 200, for example, negotiate a VSP. Specifically, the electronic device 100 sends, to the display device 200 through a Wi-Fi unicast frame, a negotiation parameter that carries the VSP. In addition, the electronic device 100 may further periodically perform receiving and sending synchronization with the display device 200, to ensure VSP synchronization at both ends. For example, a timing synchronization function (TSF) mechanism is used to ensure time synchronization between the electronic device 100 and the display device 200. Specifically, the electronic device 100 needs to periodically send a beacon frame, and the display device 200 needs to be periodically woken up to receive the beacon frame. For example, the display device 200 initializes a TSF timer, uses the beacon frame to notify another electronic device 100 of local time of the display device 200, and sets a time stamp for sending the beacon frame in order to implement receiving and sending synchronization. The electronic device 100 may further transmit scalable video coding data of a slice within a corresponding time period in the VSP (coding 1 to coding 3 are respectively transmitted in time periods VSP1 to VSP3 as shown in FIG. 3) through transmission control, and guides, with reference to the channel state, coding by the electronic device 100 on the slice. A function of the display device 200 is as follows: the display device 200 can negotiate the transmission period with the electronic device 100, receive the scalable video coding data of the slice in a negotiated VSP through transmission control, and perform data packet reordering on the scalable video coding data of the slice (for example, perform data packet reordering based on a Wi-Fi data packet sequence number (seq), and discard a packet that fails to be transmitted). The display device 200 can perform sending and receiving synchronization with the electronic device 100 based on the foregoing sending and receiving synchronization mechanism. The display device 200 can also perform slice-level scalable video decoding on reordered data packets with reference to the channel state (as shown in FIG. 3, received coding starts to be decoded in VSP2), perform data merging, and finally display a video frame on the screen. In some embodiments, the electronic device 100 may further negotiate at least one other time period (a VSP retry, or referred to as a video transmission period in a retry mechanism) after the first time period with the display device 200. In addition, the electronic device 100 may further reconstruct, after the at least one other time period, a reference frame based on a successfully transmitted portion of a scalable video coding slice. It may be understood that the reference frame is a reference object based on which P-frame coding is used for a subsequent transmitted video frame of the second video frame. For example, usually, when P-frame coding is performed on a $1^{st}$ slice of a subsequent third video frame with reference to scalable video coding of a $1^{st}$ slice of the second video frame, one or more layers of the scalable video coding of the $1^{st}$ slice of the second video frame may fail to be completely transmitted in corresponding time periods. In this case, scalable video coding is performed on the $1^{st}$ slice of the third video frame with reference to the scalable video coding of the $1^{st}$ slice of the second video frame. This may result in that the display device 200 cannot correctly perform decoding. Therefore, in some embodiments, the electronic device 100 reconstructs the video frame with reference to a successfully transmitted portion of the scalable video coding of the $1^{st}$ slice of the second video frame, and uses the reconstructed video frame as a reference object for performing scalable video coding on the $1^{st}$ slice of the third video frame.

For example, the electronic device 100 includes a terminal device that has an image display function, such as a mobile phone, a tablet computer, a laptop computer, an ultra-mobile personal computer (UMPC), a netbook, a personal digital assistant (PDA), an in-vehicle device, a user terminal (UT), a terminal device (e.g., user device, UD), user equipment (UE), or an artificial intelligence (AI) device. A specific type of the electronic device 100 is not limited in some embodiments.

The display device 200 includes, for example, a terminal device that can implement a screen display function, such as a laptop computer, a large-screen display device (such as a smart screen), a projection device, an AI device, or a tablet computer. A specific type of the display device 200 is not limited in some embodiments.

Optionally, the electronic device 100 and the display device 200 in some embodiments may be implemented by different devices. For example, the electronic device 100 and the display device 200 in some embodiments may be implemented by using a wireless projection apparatus in FIG. 4.

Figure 4:
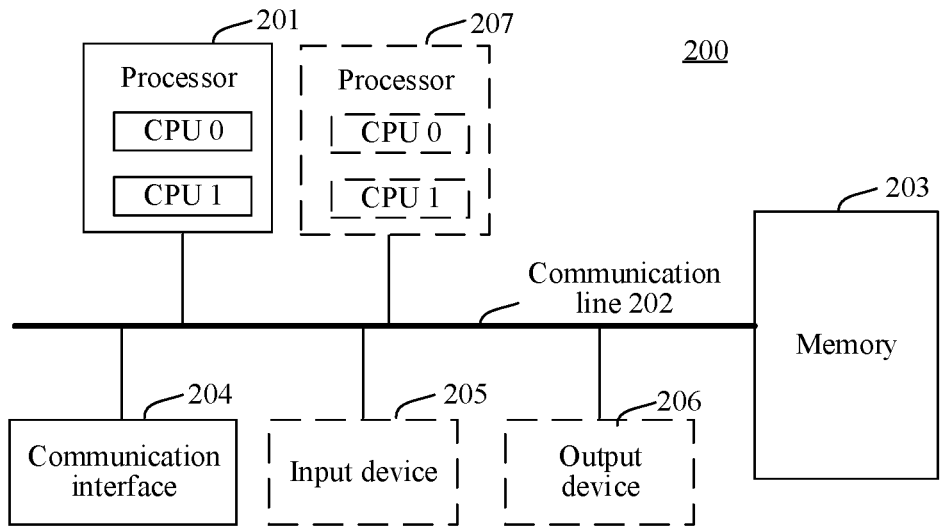
FIG. 4 is a schematic diagram of a structure of a wireless projection apparatus according to an embodiment of this application.

As shown in FIG. 4, the wireless projection apparatus 200 includes at least one processor 201, a communication line 202, a memory 203, and at least one communication interface 204. The memory 203 may alternatively be included in the processor 201.

The processor 201 may be a central processing unit (CPU), or may be another general-purpose processor, a digital signal processor (DSP), an application-specific integrated circuit (ASIC), a field programmable gate array (FPGA), or another programmable logic device, a discrete gate or a transistor logic device, a discrete hardware component, or the like. The general-purpose processor may be a microprocessor, or the processor may be any conventional processor or the like.

The communication line 202 may be a circuit connecting the foregoing components to each other and transmitting information between the foregoing components.

The communication interface 204 is configured to communicate with another device. In embodiments of this application, the communication interface 204 may be a module, a circuit, a bus, an interface, a transceiver, or another apparatus that can implement a communication function, and is configured to communicate with another device. Optionally, when the communication interface 204 is the transceiver, the transceiver may be an independently disposed transmitter, and the transmitter may be configured to send information to another device. Alternatively, the transceiver may be an independently disposed receiver, and is configured to receive information from another device. Alternatively, the transceiver may be a component that integrates the functions of sending and receiving information. An implementation of the transceiver is not limited in embodiments of this application.

The memory 203 may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. By way of example but not limitation, many forms of RAM are available, for example, static random access memory (SRAM), dynamic random access memory (DRAM), synchronous dynamic random access memory (SDRAM), double data rate synchronous dynamic random access memory (DDR SDRAM), enhanced synchronous dynamic random access memory (ESDRAM), synchlink dynamic random access memory (SLDRAM) and direct rambus random access memory (DR RAM), or other magnetic storage devices, or any other medium that can be for carrying or storing expected program code in a form of instructions or a data structure and that can be accessed by a computer, but is not limited thereto. The memory 203 may exist independently, and be connected to the processor 201 by using the communication line 202. The memory 203 may alternatively be integrated with the processor 201.

The memory 203 is configured to store computer-executable instructions for implementing the solutions of this application, and the processor 201 controls the execution. The processor 201 is configured to execute the computer-executable instructions stored in the memory 203, to implement a determining parameter determining method provided in the following embodiments of this application.

It should be noted that the memory described in this specification aims to include but is not limited to these memories and any memory of another proper type.

Optionally, the computer-executable instructions in embodiments of this application may also be referred to as application program code, instructions, a computer program, or another name. This is not limited in embodiments of this application.

During implementation, in an embodiment, the processor 201 may include one or more CPUs, for example, a CPU 0 and a CPU 1 in FIG. 4.

During implementation, in an embodiment, the wireless projection apparatus 200 may include a plurality of processors, for example, the processor 201 and a processor 207 in FIG. 4. Each of the processors may be a single-core (single-CPU) processor, or may be a multi-core (multi-CPU) processor. The processor herein may be one or more devices, circuits, and/or processing cores configured to process data (for example, computer program instructions).

During implementation, in an embodiment, the wireless projection apparatus 200 may further include an output device 205 and an input device 206. The output device 205 communicates with the processor 201, and may display information in a plurality of manners. For example, the output device 205 may be a liquid crystal display (LCD), a light emitting diode (LED) display device, a cathode ray tube (CRT) display device, or a projector. The input device 206 communicates with the processor 201, and may receive an input from a user in a plurality of manners. For example, the input device 206 may be a mouse, a keyboard, a touchscreen device, or a sensor device.

It should be noted that the wireless projection apparatus 200 may be a general-purpose device or a dedicated device. A type of the apparatus is not limited in some embodiments. A structure of the wireless projection apparatus 200 in FIG. 4 does not constitute a limitation on the wireless projection apparatus. An actual wireless projection apparatus may include more or fewer components than those in the figure, or combine some components, or have different component arrangement. The components in the figure may be implemented by hardware, software, or a combination of software and hardware.

Figure 5:
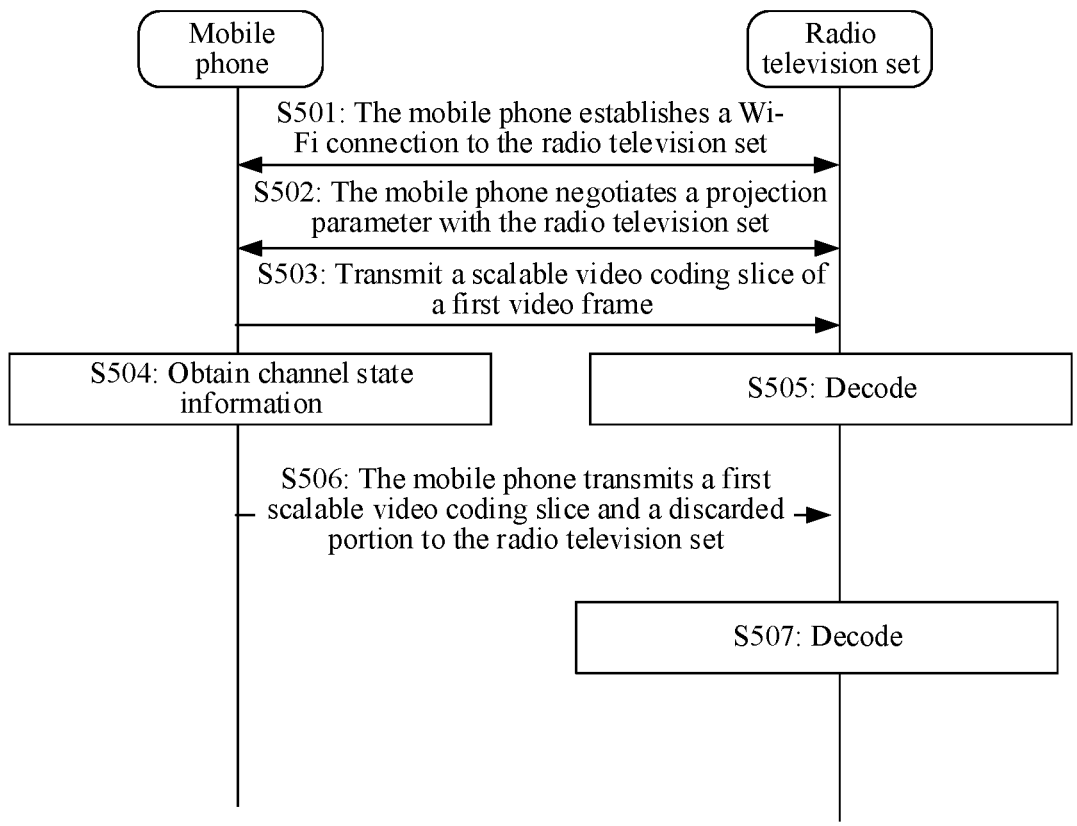
FIG. 5 is a schematic flowchart of a wireless projection method according to an embodiment of this application.

The following describes in detail, with reference to the accompanying drawings, the wireless projection method provided in embodiments of this application by using an example in which an electronic device is a mobile phone and a display device is a radio television set. FIG. 5 is a schematic flowchart of a wireless projection method according to an embodiment of this application. As shown in FIG. 5, the method may include the following steps.

S501: A mobile phone establishes a Wi-Fi connection to a radio television set.

The mobile phone and the radio television set may establish the Wi-Fi connection by using a Wi-Fi peer-to-peer (P2P) protocol. To establish the Wi-Fi connection between terminals, each terminal needs to have a transmission capability. In addition, the terminals need to know connection information about each other. The connection information may be a device identifier of the terminal, for example, an internet protocol (IP) address, a port number, or an account logged in on the terminal. The account logged in on the terminal may be an account provided by an operator for a user. The account logged in on the terminal may alternatively be an application account or the like. The transmission capability that the terminal has may be a near field communication capability, or may be a long-distance communication capability. To be specific, a wireless communication protocol used for establishing a connection between terminals, for example, a mobile phone and a radio television set, may be a near field communication protocol such as a Wi-Fi protocol, a Bluetooth protocol, or an near-filed communication (NFC) protocol, or may be a cellular network protocol. For example, the user may use the mobile phone to touch an NFC tag of the radio television set, and the mobile phone reads connection information stored in the NFC tag. For example, the connection information includes an IP address of the radio television set. Then, the mobile phone may establish, based on the IP address of the radio television set, the connection to the radio television set by using another protocol, for example, a Wi-Fi protocol. For another example, Bluetooth functions and Wi-Fi functions are enabled on both the mobile phone and the radio television set. The mobile phone may broadcast a Bluetooth signal, to discover a surrounding terminal. For example, the mobile phone may display a discovered device list. The discovered device list may include an identifier of a device discovered by the mobile phone, for example, the discovered device may include an identifier of the radio television set. In a process of discovering a device, the mobile phone may also exchange the connection information, for example, the IP address, with a discovered device. Then, after the mobile phone receives an operation of selecting the identifier of the radio television set from the device list displayed by the user, the mobile phone may establish, based on the IP address of the radio television set, the connection to the radio television set by using the Wi-Fi protocol.

S502: The mobile phone negotiates a projection parameter with the radio television set.

For example, the mobile phone may negotiate the projection parameter by sending a Wi-Fi unicast frame to the radio television set. Specifically, the Wi-Fi unicast frame may carry a VSP, a VSP retry, and delay time of projection starting. A time period in the VSP is mainly for first transmission of a scalable video coding slice of a data slice in a video frame, and a time period in the VSP retry is mainly for re-transmission of a portion that is of the scalable video coding slice of the data slice in the video frame and that is discarded in the time period in the VSP. The time period in the VSP retry has a same length as the time period in the VSP. The delay time of starting the projection for projection start time may be agreed upon by both ends.

S503: The mobile phone transmits a scalable video coding slice of a first video frame to the radio television set in a first video transmission period.

One scalable video coding slice of the first video frame may be correspondingly transmitted in one time period in the first video transmission period. First, the mobile phone needs to perform scalable video coding on a plurality of data slices of the video frame in sequence to generate a plurality of scalable video coding slices. Refer to FIG. 3. The mobile phone performs scalable video coding on a first data slice of the first video frame to generate the first scalable video coding slice (for example, coding 1), and the mobile phone performs scalable video coding on a second data slice of the first video frame to generate a second scalable video coding slice (for example, coding 2). In this way, a plurality of data slices of the first video frame are coded into a plurality of scalable video coding slices in sequence. For a scalable video coding scheme of another video frame, reference may be made to descriptions of the first video frame. It should be noted that scalable video coding for any slice needs to be completed before a time period in a video transmission period in which the slice is transmitted arrives. For example, if the first video transmission period of the first video frame includes four time periods, namely, VSP1 to VSP4, coding 1 needs to be completed in VSP0 before VSP1, and coding 2 needs to be completed in VSP1 before VSP2. In this way, the coding 1 can be transmitted in the corresponding VSP1 and the coding 2 can be transmitted in the corresponding VSP2. Specifically, for the first video frame transmitted by the mobile phone for a first time, because the first video frame can be transmitted only after the coding 1 is completed, data transmission is not performed before VSP1 (for example, VSP0). For the first video frame in a transmission process of the mobile phone (for example, there is another video frame before the first video frame), a scalable video coding slice of a data slice of another video frame before the first video frame may be transmitted in VSP0. In this embodiment, if VSP0 is empty, it only indicates that the data slice of the first video frame is not transmitted. It may be understood that, after the scalable video coding is performed on the data slice, the coding 1 may include layers having different qualities, resolutions, or frame speeds. For example, a basic layer, a first enhancement layer, a second enhancement layer, and the like. Refer to FIG. 3. The mobile phone transmits the generated coding 1 in VSP1 after VSP0. It should be noted that, in VSP1, the mobile phone may perform quality of service (QOS) control. For example, because the coding 1 includes the basic layer, the first enhancement layer, the second enhancement layer, and the like, the basic layer and the at least one enhancement layer may be transmitted in sequence based on transmission priorities of the layers.

S504: The mobile phone obtains channel state information that is fed back by the radio television set and that is for transmitting the first video frame.

The mobile phone transmits the coding 1, the coding 2, . . . , and the like in sequence in the time periods VSP1, VSP2, . . . , and the like in FIG. 3. The radio television set may feed back, to the mobile phone after each time period, channel state information for transmitting a corresponding scalable video coding slice, for example, feed back, to the mobile phone after VSP1, channel state information for transmitting the coding 1. The channel state information may include a total quantity of data packets corresponding to the coding of each slice and a quantity of data packets that are successfully transmitted in a corresponding time period. For example, a total quantity of data packets of the coding 1 and a quantity of data packets (excluding a data packet that is successfully transmitted after a data packet that fails to be transmitted) that are of the coding 1 and that are successfully transmitted in VSP1. The mobile phone and the radio television set may use a block acknowledgement (block ACK) mechanism to determine whether a data packet is successfully transmitted. For example, after receiving a series of data packets sent by the mobile phone, the radio television set correspondingly feeds back a block ACK, and the mobile phone determines, by using a bitmap in the block ACK, the quantity of data packets that are successfully transmitted. In an optional solution, the radio television set may alternatively transmit feedback information about receiving of the slice for the slice to the mobile phone, and the mobile phone determines the channel state information based on the feedback information about receiving of the slice. The electronic device may selectively enable a retry mechanism based on the channel state information. For example, the electronic device may determine channel quality based on the channel state information. When the channel quality is lower than a quality threshold, the electronic device determines that the channel quality is poor, and enables the retry mechanism. When the channel quality is higher than or equal to a quality threshold, the electronic device determines that the channel state is sufficient, and does not enable the retry mechanism. When the retry mechanism is already enabled, the electronic device disables the retry mechanism when determining that the channel state is sufficient when the channel quality is higher than or equal to a quality threshold. The quality threshold may be a quantity threshold set for successfully transmitted data packets, or a reference threshold set for a proportion of a quantity of successfully transmitted data packets in a total quantity of data packets corresponding to coding. For example, when the channel state is poor, the quantity of successfully transmitted data packets is less than a specific (e.g., predetermined) quantity threshold, or the proportion of the quantity of successfully transmitted data packets is less than the reference threshold. When the channel state is sufficient, the quantity of successfully transmitted data packets is greater than or equal to the specific (e.g., predetermined) quantity threshold, or the proportion of the quantity of successfully transmitted data packets is greater than or equal to the reference threshold. The retry mechanism is to perform step S506.

S505: The radio television set decodes the scalable video coding slice transmitted by the mobile phone in the first video transmission period.

Specifically, after the coding 1 is transmitted to the radio television set in VSP1, the radio television set starts to decode, after VSP1 (for example, in VSP2), the scalable video coding slice received in VSP1.

S506: The mobile phone transmits the first scalable video coding slice of a second video frame to the radio television set in a first time period in a second video transmission period, and transmits, to the radio television set in at least one other time period after the first time period, a portion of the first scalable video coding slice and that is discarded in the first time period. One other scalable video coding slice of the second video frame is transmitted in at least one other time period.

Figure 6:
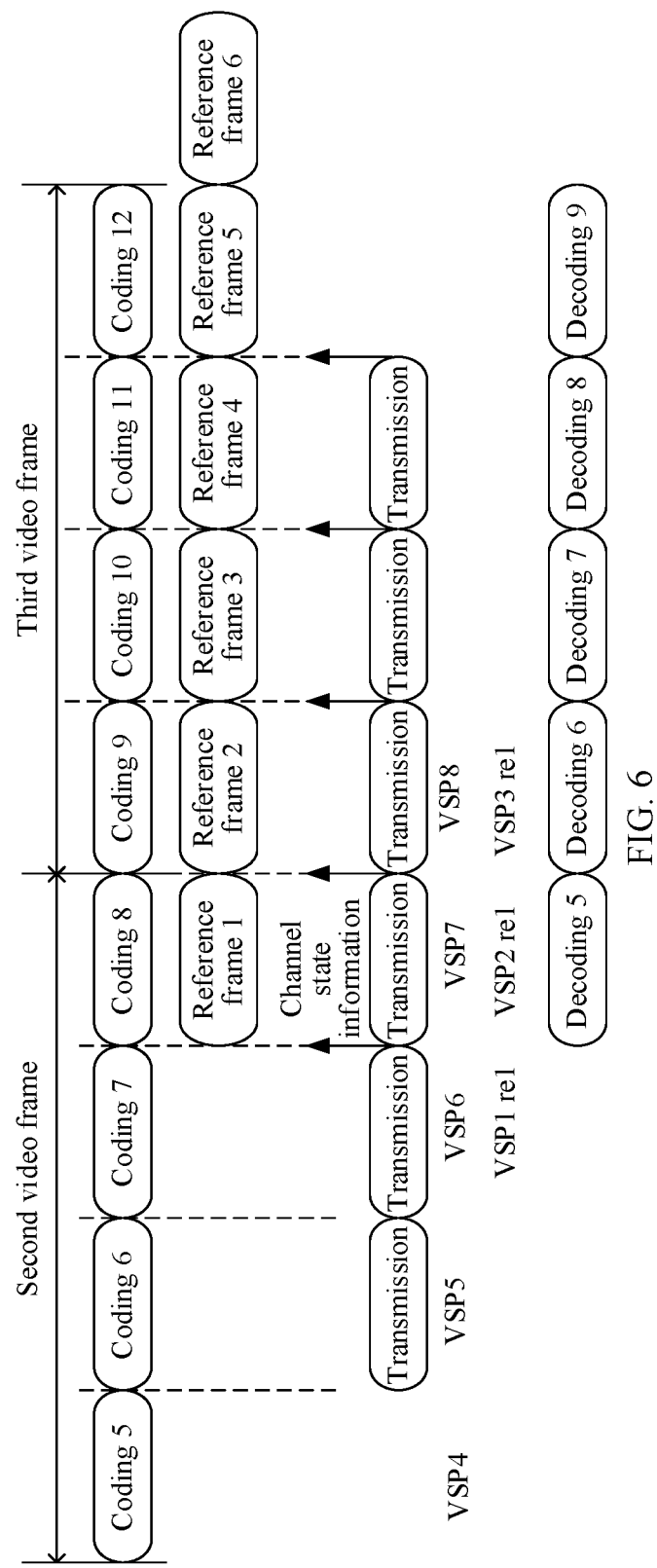
FIG. 6 is a schematic diagram of a pipeline structure of a wireless projection method according to another embodiment of this application.

As shown in FIG. 6, the second video frame is transmitted in the second video transmission period (including time periods, namely, VSP5, VSP6, VSP7, and VSP8). With reference to the foregoing descriptions, the mobile phone transmits coding 5, coding 6, . . . , and the like in sequence in the time periods VSP5, VSP6, . . . , and the like in FIG. 6. In VSP5, the mobile phone may perform QoS control. For example, because the coding 5 includes a basic layer, a first enhancement layer, a second enhancement layer, and the like, the basic layer and the at least one enhancement layer may be transmitted in sequence based on transmission priorities of the layers. Specifically, if transmission of the coding 5 is not completed in VSP5 in step S504, that is, there is a portion of the coding 5 that is discarded in VSP5, the portion of the coding 5 whose transmission is not completed is retransmitted in a time period VSP1 re1 (e.g., retry 1, retransmission for a first time) after VSP5. Specifically, the coding 5 includes coded data of a plurality of layers, for example, the basic layer and the at least one enhancement layer. In step S506, if both the basic layer and the at least one enhancement layer of the coding 5 are discarded in VSP5 (that is, transmission of both the basic layer and the at least one enhancement layer are not completed), the basic layer and the at least one enhancement layer of the coding 5 are transmitted in VSP1 re1. If transmission of the basic layer of the coding 5 is completed in VSP5 and the at least one enhancement layer is discarded in VSP5, the at least one enhancement layer of the coding 5 is transmitted in VSP1 re1. Before step S505, the VSP retry may not be enabled by default. To be specific, for each video frame, the mobile phone transmits the coding 1, the coding 2, . . . , and the like in sequence in the time periods VSP1, VSP2, . . . , and the like with reference to FIG. 3. After the VSP retry is enabled based on the channel state information, for a subsequent video frame, for example, the second video frame in FIG. 6, the coding 5, the coding 6, . . . , and the like are transmitted in sequence in the time periods VSP5, VSP6, . . . , and the like, and portions that are of the coding 5, the coding 6, . . . , and the like and that are discarded in corresponding time periods VSP5, VSP6, . . . , and the like are retransmitted in VSP1 re1, VSP2 re2, . . . , and the like. In addition, based on a negotiation result in step S502, the coding 5, the coding 6, . . . , and the like may alternatively be retransmitted for a plurality of times. For example, if the coding 5 still has a discarded portion (i.e., the transmission is not completed) after being transmitted in VSP1 and VSP1 re1, the coding 5 may be retransmitted in a time period VSP1 re2 following VSP1 re1. With reference to FIG. 6, two VSPs are included. The VSP (VSP5, VSP6, . . . , and the like) is used to transmit the coding 5, the coding 6, . . . , and the like in sequence. The portions of the coding 5, the coding 6, . . . , and the like and that are discarded in corresponding time periods VSP5, VSP6, . . . , and the like are retransmitted in the VSP retry (VSP1 re1, VSP2 re2, . . . , and the like), and in the time period (VSP7/VSP2 re1) after VSP1 re1, the radio television set decodes the received coding 5 to decoding 5. In this case, the feedback of the channel state information is delayed for one VSP (e.g., feedback of a channel state is delayed after VSP6). In addition, the electronic device may re-determine, based on the channel state information, whether to enable the retry mechanism in a subsequent video transmission period. A quantity of VSP retries may alternatively be configured to be more than two retries. For example, in FIG. 7, the quantity of VSP retries is configured to be 2. It may be understood that a larger quantity of VSP retries indicates a larger opportunity of full transmission of the coding 5, and indicates a stronger anti-instantaneous interference capability, and that more coding buffers are needed. After the VSP retry is enabled, QoS flow control is jointly performed on different priorities of different layers of a slice. For example, when a quantity of VSP retries is 1, there are two VSPs (a VSP and a VSP retry) transmission periods at a specific moment, corresponding to a VSP retry period of a previous slice and a VSP period of a current slice. In the VSP6 period, there is an opportunity to transmit data that is of the coding 5 and that is not successfully transmitted in VSP5. In an example, in VSP6, a transmission priority of a basic layer of the first scalable video coding slice (e.g., the coding 5) of the second video frame is higher than a transmission priority of a basic layer of the second scalable video coding slice (e.g., the coding 6), the transmission priority of the basic layer of the second scalable video coding slice (e.g., the coding 6) is higher than a transmission priority of an enhancement layer of the first scalable video coding slice (e.g., the coding 5), and the transmission priority of the enhancement layer of the first scalable video coding slice (e.g., the coding 5) is higher than a transmission priority of an enhancement layer of the second scalable video coding slice (e.g., the coding 6). Specifically, it is assumed that, in VSP5, a basic layer 1 of the coding 5 is transmitted successfully, and an enhancement layer 2 and an enhancement layer 3 of the coding 5 are not transmitted successfully. In VSP6, the transmission priorities of the layers in descending order are: a transmission priority of the basic layer 1 of the coding 5, a transmission priority of a basic layer 1 of the coding 6, a transmission priority of the enhancement layer 2 of the coding 5, a transmission priority of an enhancement layer 2 of the coding 6, a transmission priority of the enhancement layer 3 of the coding 5, a transmission priority of an enhancement layer 3 of the coding 6, . . . , and the like.

Figure 7:
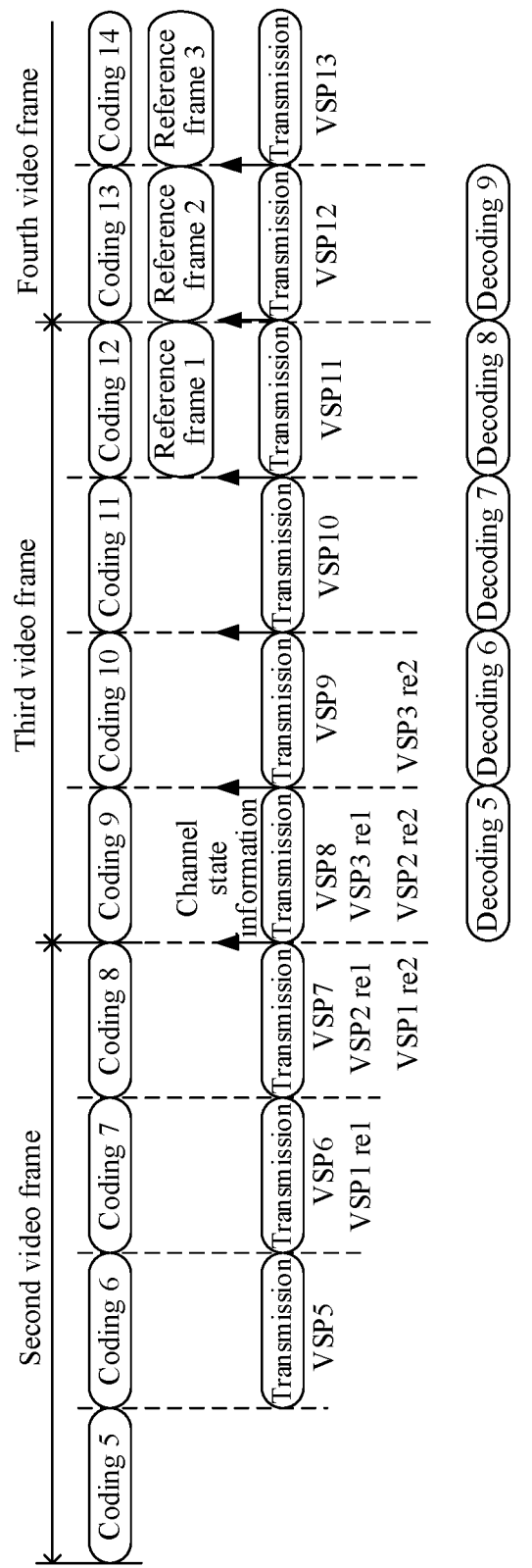
FIG. 7 is a schematic diagram of a pipeline structure of a wireless projection method according to still another embodiment of this application.

In addition, after the at least one other time period, a reference frame is reconstructed based on a successfully transmitted portion of the first scalable video coding slice, and first scalable video coding of a third video frame is generated based on the reference frame. Refer to FIG. 6. After VSP6 (e.g., VSP1 re1), the mobile phone reconstructs a reference frame 1 based on the successfully transmitted portion of the coding 5, and performs, in VSP8 based on the reference frame 1, scalable video coding on a first data slice of the third video frame to generate coding 9. The third video frame is located after the second video frame. It may be understood that the reference frame 1 is a reference object based on which P-frame coding is used for the subsequent transmitted third video frame of the second video frame. For example, usually, when P-frame coding is performed on coding 9 of the subsequent third video frame with reference to the coding 5 of the second video frame, one or more layers of the coding 5 may fail to be completely transmitted in corresponding VSP5 and VSP6. In this case, the coding 9 of the third video frame is generated with reference to the coding 5. This may result in that the radio television set cannot correctly perform decoding. In some embodiments, dynamic reference frame reconstruction is designed. The mobile phone reconstructs the reference frame 1 with reference to the successfully transmitted portion of the coding 5 of the second video frame, and uses the reconstructed video frame 1 as a reference object for generating the coding 9 of the third video frame. For example, the mobile phone reconstructs the reference frame with reference to only a basic layer that is successfully transmitted. As shown in FIG. 6, when the quantity of VSP retries is 1, the reference frame 1 is reconstructed for a delay of one VSP (e.g., reconstructed after VSP6/VSP1 re1). In this case, that P-frame coding is subsequently performed on the subsequent coding 9 based on a dynamically reconstructed reference frame 5 is not affected. In combination with bit rate control of the mobile phone, an amount of data to be coded can be significantly reduced, and the anti-interference capability during transmission can be enhanced. FIG. 6 and FIG. 7 are both described by using an example in which one video frame is divided into four slices. However, as shown in FIG. 7, when the quantity of VSP retries is 2 or greater than 2, because transmission of the coding 5 is completed and the channel state information is fed back in VSP7, the mobile phone cannot generate a reference frame of the coding 9 in time. In this case, the mobile phone may perform inter-frame reference. For example, the mobile phone may generate the reference frame 1 in VSP11 to refer to the reference frame 1 when coding 13 is generated in a next fourth video frame. Specifically, in some embodiments, a quantity of divided slices of each video frame and the quantity of VSP retries are not limited. Specifically, the quantity of slices and the quantity of VSP retries may be dynamically adjusted based on the channel state information and negotiation in step S502 with consideration of a delay and anti-interference performance.

S507: The radio television set decodes the first scalable video coding slice of the second video frame transmitted by the mobile phone in the first time period and a portion of the first scalable video coding slice and that is discarded in the first time period and that is transmitted in the at least one other time period after the first time period.

Correspondingly, before step S507, the radio television set receives the first scalable video coding slice of the second video frame transmitted by the mobile phone in the first time period in the second video transmission period, and receives the portion of the first scalable video coding slice and that is discarded in the first time period and that is transmitted by the mobile phone in the at least one other time period after the first time period. One other scalable video coding slice of the second video frame is transmitted in at least one other time period. In addition, it should be noted that the scalable video coding slice includes one basic layer and at least one enhancement layer. Specifically, the radio television set receives a basic layer and at least one enhancement layer of the first scalable video coding slice of the second video frame that are transmitted by the mobile phone in the first time period in the second video transmission period based on transmission priorities of the basic layer and the at least one enhancement layer of the first scalable video coding slice. In addition, when transmission of the basic layer and the at least one enhancement layer of the first scalable video coding slice of the second video frame is not completed in the first time period, the mobile phone receives the basic layer and the at least one enhancement layer of the first scalable video coding slice transmitted by the radio television set in the at least one other time period after the first time period. When transmission of the at least one enhancement layer of the first scalable video coding slice of the second video is not completed in the first time period, the mobile phone receives the at least one enhancement layer of the first scalable video coding slice transmitted by the radio television set in the at least one other time period after the first time period. Refer to FIG. 6. The radio television set respectively receives, in VSP5, the coding 1 transmitted by the mobile phone, and receives, in VSP6, the portion that is discarded when the mobile phone transmits the coding 5 in VSP5, and decodes the coding 1 received in VSP5 and VSP6 and displays the coding 1 on a screen.

In this way, in the foregoing solution, the mobile phone can first transmit a scalable video coding slice of a video frame in a video transmission period, for example, transmit one scalable video coding slice in a time period in a video transmission period in an initial state. Certainly, if transmission of the scalable video coding slice is not completed in a corresponding time period, the scalable video coding slice is directly discarded. Then, the mobile phone obtains the channel state information that is fed back by the radio television set and that is for transmitting any scalable video coding slice of the first video frame. For example, after each time period, the channel state information for transmitting the scalable video coding slice in the time period may be obtained. It may be understood that the channel state information may reflect a portion that is of the scalable video coding slice and that is discarded in the corresponding time period. For example, the channel state may be a total quantity of data packets of the scalable video coding slice transmitted in one time period and a quantity of data packets that are successfully transmitted. In this way, the mobile phone may selectively enable the retry mechanism based on the channel state information. For example, if the mobile phone determines, based on the channel state information, that the channel quality is poor, the mobile phone enables the retry mechanism. When the channel quality is sufficient, the mobile phone does not enable the retry mechanism. When the retry mechanism is already enabled, the mobile phone disables the retry mechanism when determining that the channel quality is e.g. During the retry mechanism, the mobile phone transmits one scalable video coding slice in a plurality of time periods in a subsequent video transmission period. For example, the mobile phone transmits a first scalable video coding slice of another video frame to the display device in a first time period in a subsequent video transmission period, and transmits, to the display device in at least one other time period after the first time period, a portion of the first scalable video coding slice and that is discarded in the first time period. One other scalable video coding slice of the second video frame is transmitted in the at least one other time period. In this way, when one scalable video coding slice has a discarded portion in a corresponding time period, the discarded portion may be transmitted in other time period. For example, when transmission of one or more of a basic layer and at least one enhancement layer of a scalable video coding slice of a slice is not completed in a corresponding time period, the basic layer and the at least one enhancement layer have an opportunity of being transmitted in a next time period. In this way, the radio television set may perform decoding with reference to the first scalable video coding slices transmitted in the two time periods. This manner ensures successful transmission of the scalable video coding slice to the extent that is feasible based on the premise that a portion of a delay is sacrificed. This results in reduced image tearing and freezing and image quality deterioration that may normally occur during wireless projection, and thereby improves the user's experience. In addition, after the at least one other time period, a reference frame is reconstructed based on the successfully transmitted portion of the first scalable video coding slice, and the first scalable video coding of the third video frame is generated based on the reference frame. In this way, when the electronic device transmits the third video frame, for the first scalable video coding slice of the second video frame, reference may be made to portions that are successfully transmitted in the first time period and the at least one other time period after the first time period. In this way, formed inter-predictive frame (e.g., predictive frame, P frame for short) coding can reduce an amount of data to be coded, and help ensure that the third video frame of the electronic device can be decoded based on an actually successfully transmitted portion after being transmitted to the display device.

It may be understood that, to implement the foregoing functions, the mobile phone and the radio television set include corresponding hardware structures and/or software modules for performing the functions. A person skilled in the art should be easily aware that, in combination with units and algorithm operations of the examples described in embodiments disclosed in this specification, these applications can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, the mobile phone may be divided into functional modules based on the foregoing method examples. For example, each functional module may be divided based on each function, or two or more functions may be integrated into one processing module. The integrated module may be implemented in a form of hardware, or may be implemented in a form of a software functional module. It should be noted that, in embodiments of this application, module division is an example, and is merely a logical function division. In actual implementation, another division manner may be used.

Figure 8:
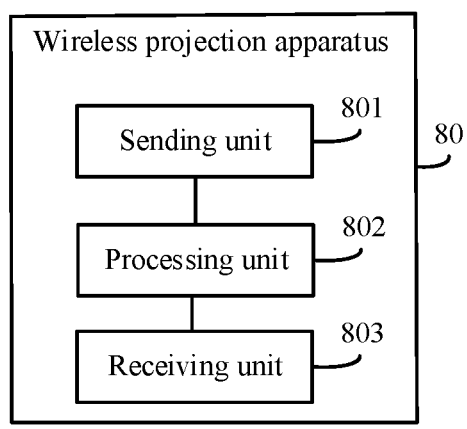
FIG. 8 is a schematic diagram of a structure of a wireless projection apparatus according to another embodiment of this application.

For example, when each functional module is divided in an integrated manner, FIG. 8 is a schematic diagram of a structure of a wireless projection apparatus 80. The wireless projection apparatus 80 may be a chip or a system on chip in the foregoing mobile phone, or another combined device, component, or the like that can implement a function of the foregoing mobile phone. The wireless projection apparatus 80 may be configured to perform the function of the mobile phone in the foregoing embodiments.

In a possible implementation, the wireless projection apparatus 80 in FIG. 8 includes a sending unit 801 (e.g., sending circuit), a processing unit 802 (e.g., processing circuit), and a receiving unit 803 (e.g., receiving circuit). The sending unit 801 is configured to transmit a scalable video coding slice of a first video frame to a display device in a first video transmission period. The receiving unit 803 is configured to obtain channel state information that is fed back by the display device and that is for transmitting the first video frame. The processing unit 802 is configured to selectively enable a retry mechanism based on the channel state information obtained by the receiver. During the retry mechanism, the sending unit 801 is further configured to transmit a first scalable video coding slice of a second video frame to the display device in a first time period in a second video transmission period, and transmit, to the display device in at least one other time period after the first time period, a portion of the first scalable video coding slice and that is discarded in the first time period. One other scalable video coding slice of the second video frame is transmitted in the at least one other time period.

Optionally, the scalable video coding slice includes one basic layer and at least one enhancement layer; and the sending unit 801 is configured to transmit the basic layer and the at least one enhancement layer of the first scalable video coding slice of the second video frame to the display device in the first time period in the second video transmission period based on transmission priorities of the basic layer and the at least one enhancement layer of the first scalable video coding slice of the second video frame.

Optionally, the scalable video coding slice includes the one basic layer and the at least one enhancement layer, the at least one other time period includes a second time period in the second video transmission period, and the other scalable video coding slice includes a second scalable video coding slice of the second video frame. The sending unit 801 is configured to transmit, to the display device in the second time period based on the transmission priorities of the basic layer and the at least one enhancement layer of the first scalable video coding slice and transmission priorities of a basic layer and at least one enhancement layer of the second scalable video coding slice, the portion of the first scalable video coding slice and that is discarded and the second scalable video coding slice. The transmission priority of the basic layer of the first scalable video coding slice is higher than the transmission priority of the basic layer of the second scalable video coding slice, the transmission priority of the basic layer of the second scalable video coding slice is higher than the transmission priority of the enhancement layer of the first scalable video coding slice, and the transmission priority of the enhancement layer of the first scalable video coding slice is higher than the transmission priority of the enhancement layer of the second scalable video coding slice.

Optionally, the discarded portion of the first scalable video coding slice includes the basic layer and the at least one enhancement layer of the first scalable video coding slice. The sending unit 801 is configured to transmit the basic layer and the at least one enhancement layer of the first scalable video coding slice to the display device in the at least one other time period after the first time period.

Optionally, the discarded portion of the first scalable video coding slice includes the at least one enhancement layer of the first scalable video coding slice. The sending unit 801 is configured to transmit the at least one enhancement layer of the first scalable video coding slice to the display device in the at least one other time period after the first time period.

Optionally, the processing unit 802 is further configured to, after the at least one other time period, reconstruct a reference frame based on a successfully transmitted portion of the first scalable video coding slice. The processing unit 802 is further configured to generate the first scalable video coding of the third video frame based on the reference frame.

All related content of the operations in the foregoing method embodiments may be cited in function descriptions of the corresponding functional modules. Details are not described herein again.

In this embodiment, the wireless projection apparatus 80 is presented in a form of functional modules divided in an integrated manner. The module herein may be an ASIC, a circuit, a processor that executes one or more software or firmware programs, a memory, an integrated logic circuit, and/or another component capable of providing the foregoing functions. In a basic embodiment, a person skilled in the art may determine that the wireless projection apparatus 80 may be in the form in FIG. 4.

For example, the processor 201 may invoke the computer-executable instructions stored in the memory 203 in FIG. 4, to enable the wireless projection apparatus to perform the wireless projection method in the foregoing method embodiments.

For example, functions/implementation processes of the sending unit 801, the processing unit 802 and the receiving unit 803 in FIG. 8 may be implemented by the processor 201 by invoking the computer-executable instructions stored in the memory 203 in FIG. 4. Alternatively, functions/implementation processes of the processing unit 802 in FIG. 8 may be implemented by the processor 201 by invoking the computer-executable instructions stored in the memory 203 in FIG. 4, and functions/implementation processes of the sending unit 801 in FIG. 8 may be implemented by the transmitter in the communication interface 204 in FIG. 4. The functions/implementation processes of the receiving unit 803 in FIG. 8 may be implemented by the receiver in the communication interface 204 in FIG. 4.

The wireless projection apparatus 80 provided in this embodiment may perform the wireless projection method. Therefore, for technical effects that can be achieved by the wireless projection apparatus 80, refer to the foregoing method embodiments. Details are not described herein again.

In embodiments of this application, the radio television set may be divided into functional modules based on the foregoing method examples. For example, each functional module may be divided based on each function, or two or more functions may be integrated into one processing module. The integrated module may be implemented in a form of hardware, or may be implemented in a form of a software functional module. It should be noted that, in embodiments of this application, module division is an example, and is merely a logical function division. In actual implementation, another division manner may be used.

Figure 9:
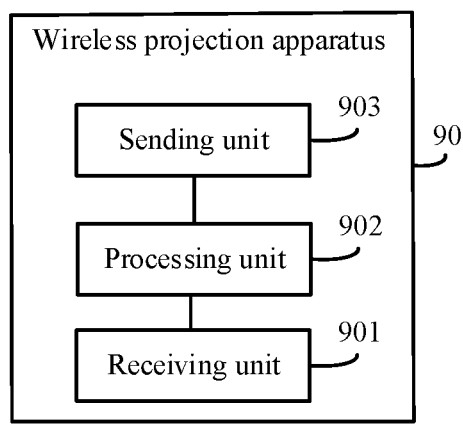
FIG. 9 is a schematic diagram of a structure of a wireless projection apparatus according to still another embodiment of this application.

For example, when each functional module is divided in an integrated manner, FIG. 9 is a schematic diagram of a structure of a wireless projection apparatus 90. The wireless projection apparatus 90 may be a chip or a system on chip in the foregoing radio television set, or another combined device, component, or the like that can implement a function of the foregoing radio television set. The wireless projection apparatus 90 may be configured to perform the function of the radio television set in the foregoing embodiments.

In a possible implementation, the wireless projection apparatus 90 in FIG. 9 includes a receiving unit 901 (e.g., receiving circuit), a processing unit 902 (e.g., processing circuit), and a sending unit 903 (e.g., sending circuit). The receiving unit 901 is configured to receive a scalable video coding slice of a first video frame that is transmitted by an electronic device to the display device in a first video transmission period. The sending unit 903 is configured to feed back, to the electronic device, channel state information for transmitting the first video frame. The electronic device selectively enables a retry mechanism based on the channel state information. The processing unit 902 is configured to decode the scalable video coding slice transmitted by the electronic device in the first video transmission period. The receiving unit 901 is further configured to receive a first scalable video coding slice of a second video frame transmitted by the electronic device in a first time period in a second video transmission period in the retry mechanism and receive a portion of the first scalable video coding slice and that is discarded in the first time period and that is transmitted by the electronic device in at least one other time period after the first time period. One other scalable video coding slice of the second video frame is transmitted in the at least one other time period. The processing unit 902 is further configured to decode the first scalable video coding slice of the second video frame transmitted by the electronic device in the first time period and the portion of the first scalable video coding slice and that is discarded in the first time period and that is transmitted in the at least one other time period after the first time period.

Alternatively, the scalable video coding slice includes one basic layer and at least one enhancement layer. The receiving unit 901 is configured to receive the basic layer and the at least one enhancement layer of the first scalable video coding slice of the second video frame that are transmitted by the electronic device in the first time period in the second video transmission period based on transmission priorities of the basic layer and the at least one enhancement layer of the first scalable video coding slice.

Optionally, the scalable video coding slice includes the one basic layer and the at least one enhancement layer; and the receiving unit 901 is configured to receive the basic layer and the at least one enhancement layer of the first scalable video coding slice that are transmitted by the electronic device in the at least one other time period after the first time period.

Optionally, the scalable video coding slice includes the one basic layer and the at least one enhancement layer. The receiving unit 901 is configured to receive the at least one enhancement layer of the first scalable video coding slice transmitted by the electronic device in the at least one other time period after the first time period.

All related content of the operations in the foregoing method embodiments may be cited in function descriptions of the corresponding functional modules. Details are not described herein again.

In this embodiment, the wireless projection apparatus 90 is presented in a form of functional modules divided in the integrated manner. The module herein may be an ASIC, a circuit, a processor that executes one or more software or firmware programs, a memory, an integrated logic circuit, and/or another component capable of providing the foregoing functions. In a basic embodiment, a person skilled in the art may determine that the wireless projection apparatus 90 may be in the form in FIG. 4.

For example, the processor 201 may invoke the computer-executable instructions stored in the memory 203 in FIG. 4, to enable the wireless projection apparatus 90 to perform the wireless projection method in the foregoing method embodiments.

For example, functions/implementation processes of the receiving unit 901, the processing unit 902 and the sending unit 903 in FIG. 9 may be implemented by the processor 201 by invoking the computer-executable instructions stored in the memory 203 in FIG. 4. Alternatively, functions/implementation processes of the processing unit 902 in FIG. 9 may be implemented by the processor 201 by invoking the computer-executable instructions stored in the memory 203 in FIG. 4, and functions/implementation processes of the receiving unit 901 in FIG. 9 may be implemented by the receiver in the communication interface 204 in FIG. 4. The functions/implementation processes of the sending unit 903 in FIG. 9 may be implemented by the transmitter in the communication interface 204 in FIG. 4.

The wireless projection apparatus 90 provided in this embodiment may perform the wireless projection method. Therefore, for technical effects that can be achieved by the wireless projection apparatus 90, refer to the foregoing method embodiments. Details are not described herein again.

Optionally, an embodiment of this application further provides a wireless projection apparatus (for example, the wireless projection apparatus may be a chip or a chip system). The wireless projection apparatus includes a processor and an interface, and the processor is configured to read instructions to perform the method in any one of the foregoing method embodiments. In a possible design, the wireless projection apparatus further includes a memory. The memory is configured to store necessary program instructions and necessary data. The memory may invoke program code stored in the memory, to instruct the wireless projection apparatus to perform the method in any one of the foregoing method embodiments. Certainly, the memory may alternatively not be in the wireless projection apparatus. When the wireless projection apparatus is a chip system, the wireless projection apparatus may include a chip, or may include a chip and another discrete component. This is not limited in embodiments of this application.

Specifically, when the wireless projection apparatus 80 in FIG. 8 is a mobile phone, and the wireless projection apparatus 90 in FIG. 9 is a radio television set, the sending unit 801 and the sending unit 903 may be transmitters during the information transmission, the receiving unit 803 and the receiving unit 901 may be receivers during the information transmission, and the receiving unit may be a transceiver. The transceiver, the transmitter, or the receiver may be a radio frequency circuit. When the wireless projection apparatus 80 in FIG. 8 and the wireless projection apparatus 90 in FIG. 9 include a storage unit (e.g., storage circuit), the storage unit is configured to store the computer instructions, the processor is communicatively connected to the memory, and the processor executes the computer instruction stored in the memory, so that the wireless projection apparatus performs the method in the method embodiments. The processor may be a general-purpose CPU, a microprocessor, or an ASIC.

When the wireless projection apparatus in FIG. 8 and the wireless projection apparatus in FIG. 9 are chips, the sending unit 801, the sending unit 903, the receiving unit 803, and the receiving unit 901 may be input and/or output interfaces, pins, circuits, or the like. The processing unit 802 and the processing unit 902 may execute the computer-executable instructions stored in the storage unit, so that the wireless projection apparatus 80 in FIG. 8 and the chip in the wireless projection apparatus 90 in FIG. 9 perform the method in the method embodiments. Optionally, the storage unit is a storage unit in the chip, for example, a register or a cache. Alternatively, the storage unit may be a storage unit that is in the terminal device or the network device and that is located outside the chip, for example, a ROM or another type of static storage device that can store static information and instructions, or a RAM.

All or a part of the foregoing embodiments may be implemented by software, hardware, firmware, or any combination thereof. When a software program is used to implement embodiments, embodiments may be implemented completely or partially in a form of a computer program product. The computer program product includes one or more computer instructions. When the computer program instructions are loaded and executed on the computer, the procedure or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk drive, or a magnetic tape), an optical medium (for example, a DVD), a semiconductor medium (for example, a solid state drive (SSD)), or the like. In embodiments of this application, the computer may include the apparatus described above.

Although this application is described with reference to embodiments, in a process of implementing this application that claims protection, a person skilled in the art may understand and implement another variation of the disclosed embodiments by viewing the accompanying drawings, disclosed content, and appended claims. In the claims, "comprising" does not exclude another component or another step, and "a" or "one" does not exclude a case of multiple. A single processor or another unit may implement several functions enumerated in the claims. Some measures are recorded in dependent claims that are different from each other, but this does not mean that these measures cannot be combined to produce a better effect.

Although this application is described with reference to specific features and embodiments thereof, it is clear that various modifications and combinations may be made to them without departing from the spirit and scope of this application. Correspondingly, the specification and accompanying drawings are merely example description of this application defined by the accompanying claims, and are considered as any of or all modifications, variations, combinations, or equivalents that cover the scope of this application. It is clearly that a person skilled in the art can make various modifications and variations to this application without departing from the spirit and scope of this application. This application is intended to cover these modifications and variations of this application, provided that they fall within the scope of the claims and their equivalent technologies of this application.

What is claimed is:

1. A wireless projection method, applied to a Wi-Fi communication system, and comprising:
   transmitting, by an electronic device, a scalable video coding slice of a first video frame to a display device in a first video transmission period;
   obtaining, by the electronic device, channel state information that is fed back by the display device and that is utilized for transmitting the first video frame; and
   selectively enabling, based on the channel state information, the electronic device to:
      transmit, a first scalable video coding slice of a second video frame to the display device in a first time period of a second video transmission period, and
      transmit, to the display device in at least one other time period after the first time period, a portion of the first scalable video coding slice that is discarded in the first time period, wherein one other scalable video coding slice of the second video frame is transmitted in the at least one other time period.

2. The wireless projection method according to claim 1, wherein the scalable video coding slice comprises one basic layer and at least one enhancement layer; and
   that the electronic device transmits the first scalable coding slice of the second video frame in the first time period of the second video transmission period comprises that the electronic device transmits a basic layer and at least one enhancement layer of the first scalable video coding slice of the second video frame to the display device in the first time period in the second video transmission period based on transmission priorities of the basic layer and the at least one enhancement layer of the first scalable video coding slice of the second video frame.

3. The wireless projection method according to claim 1, wherein the scalable video coding slice comprises one basic layer and at least one enhancement layer, the at least one other time period comprises a second time period of the second video transmission period, and the other scalable video coding slice comprises a second scalable video coding slice of the second video frame; and
   that the electronic device transmits, to the display device in at least one other time period after the first time period, the portion of the first scalable video coding slice that is discarded in the first time period comprises:
   the electronic device transmits, to the display device in the second time period based on the transmission priorities of the basic layer and the at least one enhancement layer of the first scalable video coding slice and transmission priorities of a basic layer and at least one enhancement layer of the second scalable video coding slice, the portion of the first scalable video coding slice that is discarded and the second scalable video coding slice,
   wherein the transmission priority of the basic layer of the first scalable video coding slice is higher than the transmission priority of the basic layer of the second scalable video coding slice, the transmission priority of the basic layer of the second scalable video coding slice is higher than the transmission priority of the enhancement layer of the first scalable video coding slice, and the transmission priority of the enhancement layer of the first scalable video coding slice is higher than the transmission priority of the enhancement layer of the second scalable video coding slice.

4. The wireless projection method according to claim 1, wherein the discarded portion of the first scalable video coding slice comprises one basic layer and at least one enhancement layer of the first scalable video coding slice; and
   that the electronic device transmits, to the display device in at least one other time period after the first time period, the portion of the first scalable video coding slice that is discarded in the first time period comprises:
   the electronic device transmits the basic layer and the at least one enhancement layer of the first scalable video coding slice to the display device in the at least one other time period after the first time period.

5. The wireless projection method according to claim 1, wherein the discarded portion of the first scalable video coding slice comprises at least one enhancement layer of the first scalable video coding slice; and
   that the electronic device transmits, to the display device in at least one other time period after the first time period, the portion of the first scalable video coding slice that is discarded in the first time period comprises:
   the electronic device transmits the at least one enhancement layer of the first scalable video coding slice to the display device in the at least one other time period after the first time period.

6. The wireless projection method according to claim 1, further comprising:
   reconstructing, after the at least one other time period, a reference frame based on a successfully transmitted portion of the first scalable video coding slice; and
   generating first scalable video coding of a third video frame based on the reference frame.

7. A computer program that includes instructions stored on a memory, wherein when the instructions are executed by a processor, the method according to claim 1 is implemented.

8. A non-transitory computer-readable medium storing a program, wherein when the program is executed by a processor, the method according to claim 1 is implemented.

9. A chip system that comprises the Wi-Fi communication system, the chip system being configured to implement the method according to claim 1.

10. A wireless projection method, applied to a Wi-Fi communication system, and comprising:
   receiving, by a display device, a scalable video coding slice of a first video frame that is transmitted by an electronic device to the display device in a first video transmission period;
   feeding back, by the display device to the electronic device, channel state information for transmitting the first video frame;
   decoding, by the display device, the scalable video coding slice transmitted by the electronic device in the first video transmission period;
   receiving, by the display device, a first scalable video coding slice of a second video frame transmitted by the electronic device in a first time period of a second video transmission period when the electronic device is selectively enabled to transmit based on the channel state information;

receiving, by the display device, a portion of the first scalable video coding slice that is discarded in the first time period and that is transmitted by the electronic device in at least one other time period after the first time period, wherein one other scalable video coding slice of the second video frame is transmitted in the at least one other time period; and decoding, by the display device, the first scalable video coding slice of the second video frame transmitted by the electronic device in the first time period and the portion of the first scalable video coding slice that is discarded in the first time period and that is transmitted in the at least one other time period after the first time period.

11. The wireless projection method according to claim 10, wherein the scalable video coding slice comprises one basic layer and at least one enhancement layer; and the receiving, by the display device, the first scalable video coding slice of the second video frame transmitted by the electronic device in the first time period in the second video transmission period comprises:

receiving, by the display device, a basic layer and at least one enhancement layer of the first scalable video coding slice of the second video frame that are transmitted by the electronic device in the first time period of the second video transmission period based on transmission priorities of the basic layer and the at least one enhancement layer of the first scalable video coding slice.

12. The wireless projection method according to claim 10, wherein the scalable video coding slice comprises one basic layer and at least one enhancement layer; and the receiving, by the display device, the portion of the first scalable video coding slice that is discarded in the first time period and that is transmitted by the electronic device in the at least one other time period after the first time period comprises:

receiving, by the display device, a basic layer and at least one enhancement layer of the first scalable video coding slice that are transmitted by the electronic device in the at least one other time period after the first time period.

13. The wireless projection method according to claim 10, wherein the scalable video coding slice comprises one basic layer and at least one enhancement layer; and the receiving, by the display device, the portion of the first scalable video coding slice that is discarded in the first time period and that is transmitted by the electronic device in at least one other time period after the first time period comprises:

receiving, by the display device, at least one enhancement layer of the first scalable video coding slice transmitted by the electronic device in the at least one other time period after the first time period.

14. A computer program that includes instructions stored on a memory, wherein when the instructions are executed by a processor, the method according to claim 10 is implemented.

15. A non-transitory computer-readable medium storing a program, wherein when the program is executed by a processor, the method according to claim 10 is implemented.

16. A chip system that comprises the Wi-Fi communication system, the chip system being configured to implement the method according to claim 10.

17. A wireless projection apparatus, used in a Wi-Fi communication system, and comprising:

a transmitter configured to transmit a scalable video coding slice of a first video frame to a display device in a first video transmission period;

a receiver configured to obtain channel state information that is fed back by the display device and that is utilized for transmitting the first video frame; and a processor configured to selectively enable, based on the channel state information obtained by the receiver, the transmitter to be further configured to:

transmit a first scalable video coding slice of a second video frame to the display device in a first time period of a second video transmission period, and transmit, to the display device in at least one other time period after the first time period, a portion of the first scalable video coding slice that is discarded in the first time period, wherein one other scalable video coding slice of the second video frame is transmitted in the at least one other time period.

18. A wireless projection apparatus, used in a Wi-Fi communication system, and comprising:

a receiver configured to receive a scalable video coding slice of a first video frame that is transmitted by an electronic device to a display device in a first video transmission period;

a transmitter configured to feed back, to the electronic device, channel state information for transmitting the first video frame; and a processor configured to decode the scalable video coding slice transmitted by the electronic device in the first video transmission period, wherein the receiver is further configured to:

receive a first scalable video coding slice of a second video frame transmitted by the electronic device in a first time period of a second video transmission period when the electronic device is selectively enabled to transmit based on the channel state information, and receive a portion of the first scalable video coding slice that is discarded in the first time period and that is transmitted by the electronic device in at least one other time period after the first time period, wherein one other scalable video coding slice of the second video frame is transmitted in the at least one other time period; and the processor is further configured to decode the first scalable video coding slice of the second video frame transmitted by the electronic device in the first time period and the portion of the first scalable video coding slice that is discarded in the first time period and that is transmitted in the at least one other time period after the first time period.

* * * * *